United States Patent [19]

Andersson

[11] 4,069,737
[45] Jan. 24, 1978

[54] DEVICE FOR TRANSFER OF A CONVENTIONAL NOTE SYSTEM INTO A SYSTEM INDICATING THE POSITION OF THE HAND WHEN PLAYING STRING INSTRUMENTS

[76] Inventor: John O. Andersson, Ugglevagen 15 B, S-130 10 Ektorp, Sweden

[21] Appl. No.: 652,316

[22] Filed: Jan. 26, 1976

[30] Foreign Application Priority Data

Jan. 30, 1975 Sweden .............................. 7501049

[51] Int. Cl.² ............................................ G10B 15/00
[52] U.S. Cl. ................................................ 84/485 SR
[58] Field of Search ............... 84/485 R, 485 SR, 473, 84/471

[56] References Cited

U.S. PATENT DOCUMENTS

| | | | |
|---|---|---|---|
| 1,200,367 | 10/1916 | Kinney | 84/485 |
| 2,001,191 | 5/1935 | Golden | 84/485 |
| 3,245,303 | 4/1966 | Patt | 84/485 |
| 3,668,967 | 6/1972 | Malis | 84/485 |
| 3,712,167 | 1/1973 | Renault | 84/485 |
| 3,748,947 | 7/1973 | Freiheit | 84/485 |
| 3,785,240 | 1/1974 | Hill | 84/485 |
| 3,894,465 | 7/1975 | Simmons | 84/485 |

*Primary Examiner*—Stephen J. Tomsky

[57] ABSTRACT

The invention relates to a device intended to facilitate play on a musical string instrument by transfer of the notes for a tune to be played from the conventional note sheet onto a note sheet where the tones are indicated so as they are to be found at predetermined places on the individual strings of the instrument by the fingers of the hand acting on the strings. The device consists mainly of a preferably rectangular, flat, elongated slotted slider and a preferably rectangular, flat, elongated slide member housed in the slot so as to allow mutual sliding displacement. The slide member is provided with longitudinally extending parallel rows of conventional tone designations by characters, the number of said rows equalling the number of the strings of the instrument. The tone designating characters are in each row positioned according to their subsequent locations on the string. The slide member is formed with one or several apertures disposed according to a specific pattern so as to be capable of uncovering groups of tone designations belonging to either the same key or the same chord. The opposite side of the slider and slide member device may be formed with tone designations on the slide and apertures in the slider grouped so as in predeterminable setting positions relative one another to lay open the chords and keys belonging to the specific keytone of each of the strings of the instrument. By means of this device a note sheet can be prepared which renders possible immediately to read off the positions of each finger of the hand acting on the individual strings for producing the tune in consideration. This novel note sheet has groups of parallel horizontal lines the number of which equals the number of the strings of the instrument and the notes are marked on the lines only, with an adjacent annotation of the number of the finger to be pressed against the string at the location indicated by the position of the note, the general location of the hand with its four fingers relative the strings of the instrument being determined by a separate illustration beside the groups of lines. The desired tune can be played from the novel note sheet by a player with the normal training for playing the instrument in consideration.

7 Claims, 3 Drawing Figures

Fig. 3

DEVICE FOR TRANSFER OF A CONVENTIONAL NOTE SYSTEM INTO A SYSTEM INDICATING THE POSITION OF THE HAND WHEN PLAYING STRING INSTRUMENTS

BACKGROUND OF THE INVENTION

This invention relates to a device for transfer of a conventional note system in connection with playing a musical string instrument into a system which directly indicates the location of the fingers of the hand on the individual strings where the various tones shall be produced. Whereas in the conventional note system the notes are put down on note rows each comprising five mutually parallel lines where each line and the interspaces therebetween indicate a specific tone the present invention is based on a quite other concept, it being one main object of the invention to provide a note system where each tone designation directly notifies to the player where the tone is to be found on the instrument proper.

Another essential object of the invention is in this connection highly to facilitate to learn how to play the instrument, primarily a guitar or mandolin or a similar string instrument, and thereby to shorten the time required for such learning.

SUMMARY OF THE INVENTION

To this end the invention relates firstly to the means required for transferring tunes set to music in conventional manner onto note sheets suited to the new system, and secondly to the note sheets prepared according to the novel system.

An essential property characterizing the invention consists therein that the device comprises a slotted slider and a slide member housed therein, said slider and said slide member being slidably displaceable relatively to one another, the slide member being provided with mutually parallel, longitudinally extending rows of conventional tone designations based on characters, the number of said rows equalling the number of strings of the instrument, said designations in each row being placed according to their subsequent positions on the string, th slider having at least one opening devised separately to lay open groups of tone designations of specific character by belonging to one and the same key or chord.

Further objects, advantages and characterizing features of the invention will become apparent from the following description of a preferred embodiment of the invention, considered in connection with the accompanying drawings of which:

BRIEF DESCRIPTION OF THE DRAWINGS

FIG. 3 is a top view of a note sheet made according to the novel system.

DESCRIPTION OF THE PREFERRED EMBODIMENT

Figure 2:
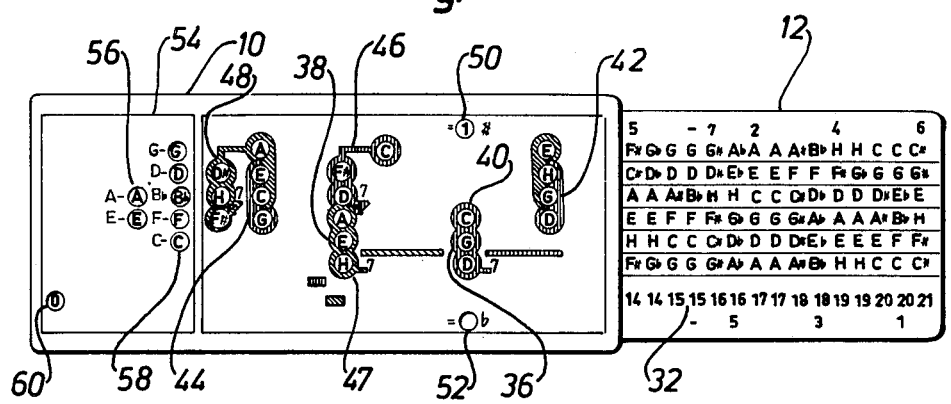
FIG. 2 is a side elevation viewed from the opposite direction.
Figure 1:
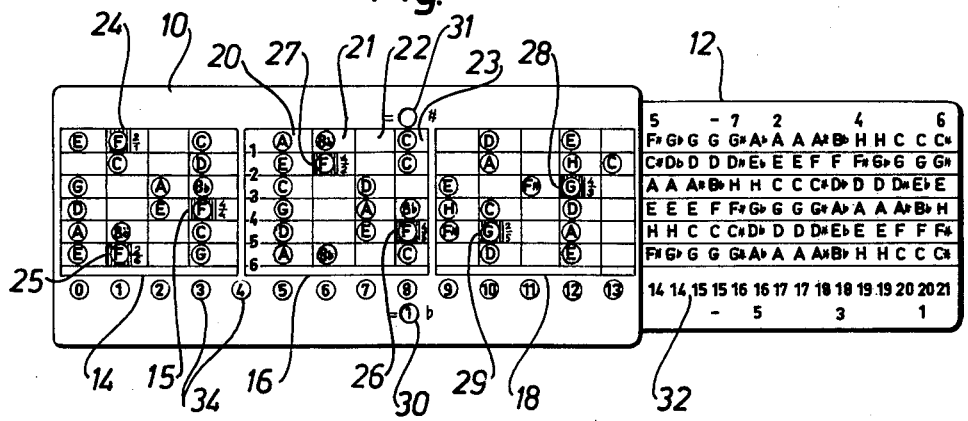
FIG. 1 is a side elevation of the parts comprised in the novel note transfer device.

Referring now to the drawings and particularly FIGS. 1 and 2, reference numeral 10 denotes a rectangular elongated slider composed of two sheets of rigid material such as stiff cardboard or plastic, which may be cemented together along their longitudinal edges by means of strap-shaped spacers so as to define a narrow slot suited to a flat, rectangular, elongated slide member 12 made of similar material as the slider. Disposed on the slide member 12 in the embodiment according to FIGS. 1 and 2 are tone designations by means of characters of known kind in a number of rows transversally to the direction of movement of the slide member corresponding to the number of the strings on the musical instrument. The embodiment according to FIGS. 1 through 3 relates to a guitar which has six strings which thus is the number of rows of tone designations on the slide member. Each row of tone designations commences with the keynote of the string, and thus the first designation to the left on the slide member is that of the keynote of the respective strings, viz. E, H, G, D, A and E. Thereafter follow with even spacing the tone designations according to a chromatic scale along the string comprising about two octaves, for example. In this way each row of characters represents all tones which can be produced by means of each of the strings in consideration. All whole tones and semi-tones are thus twice represented in each two octaves comprising row.

The instrument is in known manner on its fingerboard provided with transverse frets against which the strings are pressed down when the tones are to be produced. The numbers of these frets are denoted below the rows of tone designations by the characters 0 and upwards. Thus, in correspondence to the number of whole and semi-tones each fret is represented twice in the six rows. The row of tone designations by characters for the A-string will thus be from the keytone A: A, A sharp, B flat, H, H, C, C, C sharp, D flat etc.

The slider 10 according to the embodiment shown in FIGS. 1 and 2 is on its one side formed with several fields, the number of which in the illustrated embodiment is three, denoted 14, 16 and 18. Each field has mutually parallel longitudinal lines which correspond to the number of strings of the instrument. These lines may be designated by numerals 1 through 6 as is shown in the central field 16. Each field is subdivided in the longitudinal direction of the slider into four portions 20 to 23, which represent the four fingers active in the pressing of the strings against the frets. Thus, numeral 20 refers to the fore or index finger, numeral 21 to the middle finger etc. Formed in each field are circular apertures or indexing windows which are located straight in front of the designations by characters on the underlying slide member. Certain apertures, viz. the apertures 15, 24, 25 in field 14, the apertures 26, 27 in field 16 and the apertures 28, 29 in field 18 are marked in a specific manner distinguishing them from the other apertures e.g. by red Color. Furthermore, the apertures in each field are distributed in such a predetermined pattern that they indicate the tone designations which form the scale in each occuring key. Selected keys are set so that they appear with their keynote in the specifically marked apertures. In the position set in FIG. 1, this keynote is F in the fields 14 and 16 and G in the field 18. F Major has a flat which can be indicated through an aperture 30 below the central field. An aperture 31 in the top portion of the central field indicates the number of sharps in keys defined by sharps. Corresponding to the row of numerals 32 designating the frets in the slide member 12 the slider has apertures 34 for each second fret numerals which thus lay open the fret numerals which are below the slider. In FIG. 1 the central field 16 is set with the four finger rows 20 through 23 straight above the frets 5 through 8. Now, the scale F Major can be played by a person not having any particular ability by commencing to play with the fourth finger 4 which is pressed down against the string 5 at the exposed tone F. The next following tone G is obtained by pressing down string 4 with finger 1. The tone A is obtained by pressing down string 4 with finger 3 and the tone B flat by pressing down string 4 with the finger 4 etc.

Figure 3:
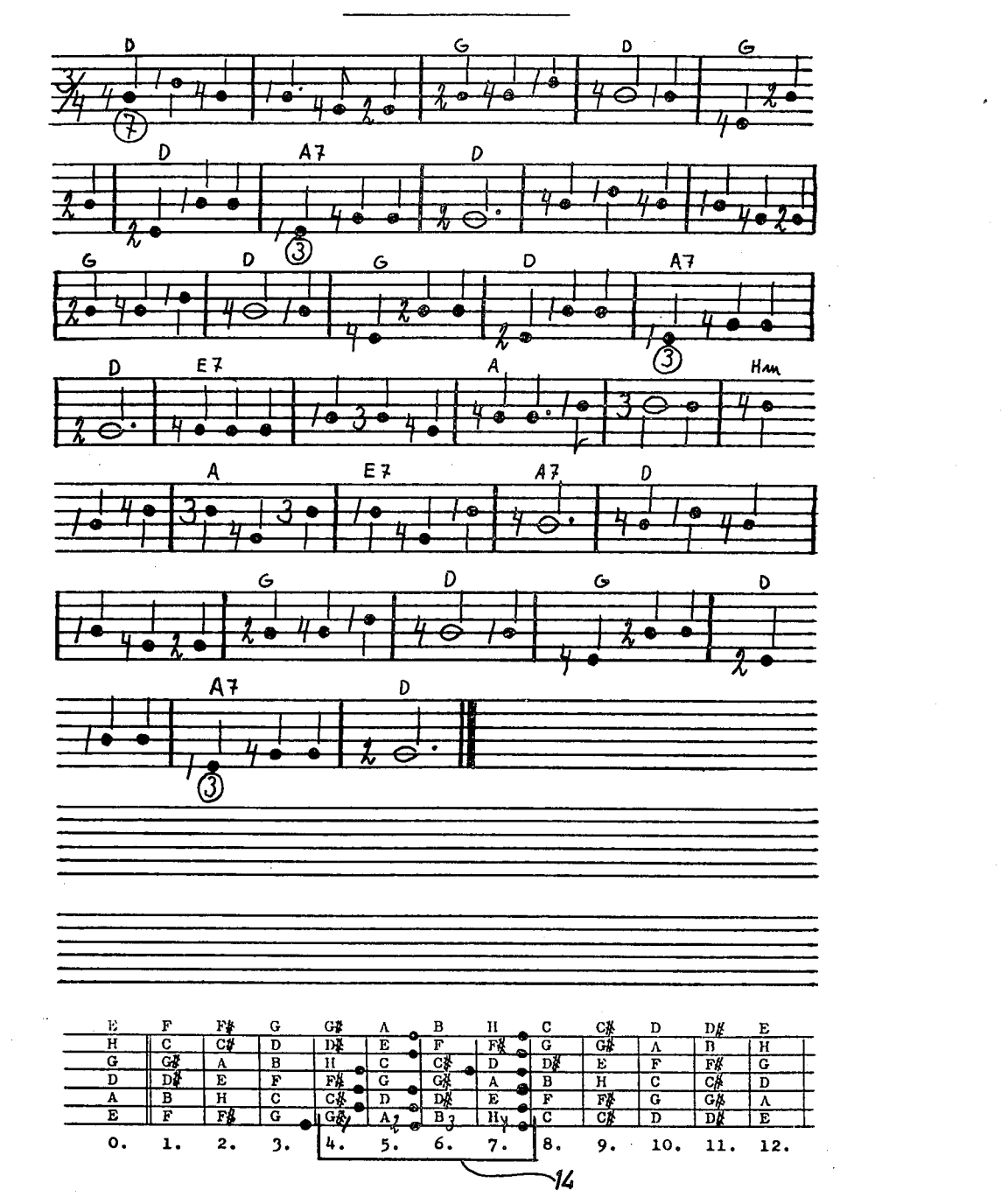

By application of these means the note sheet according to FIG. 3 can be produced. It is intended to play the well-known Swedish tune "Flickan fran Backafall" in D Major and A Major on the frets 4 through 7. The note sheet has groups of mutually parallel lines positioned one below the other for reproducing the tune by notes of conventional kind. However, each group contains six lines and represents the various strings of the guitar instrument. At the same time, there is designed ahead of each note the finger which has to produce the tone. In the bottom portion of the note sheet there is represented that section of the slider which with its field 14 is set relatively the frets 4 through 7 against which the fingers are to be pressed.

The first quarter-note left-hand in the uppermost group of lines shall correspond to the fourth finger i.e. the little finger positioned on the fourth string which according to the bottom portion of field 14 corresponds to the tone A according to usual tone nomenclature. The next following tone marking is positioned to the third string and shall be produced by means of a finger one or forefinger, thereupon follows again the same tone as the first one. In the next following time section the first note indicates that the tone shall be produced by the forth string and with the finger 1 which corresponds to a F sharp in the field 14 etc. It should be pointed out that the tones coming into consideration for the key are indicated by filled circular marks in field 14.

Above each row of notes may be indicated the chords D, G etc. for accompaniment, if desired, according to conventional system. The numerals 3 visible at several places within a circular line below a note indicate that finger 1 must be displaced sidewards one step outside field 14 since the tone has a lower position than what is comprised by said field.

According to the invention it is possible to transform note sheets according to a conventional system into note sheets according to the invention which permits to reproduce a tune without particular basic knowledge. This implies also that the learning and training time is shortened considerably. The field positioned at the bottom according to FIG. 3 gives direct teaching how the tone scale for the key in consideration shall be produced on the strings. It is easily understood that all key-signatures according to the conventional note system disappear.

The rear side of the slider 10 according to FIG. 2 renders instruction about the chords in all occurring keys and thus for both key Major and key Minor. On this side, the slide member 12 has designations by characters for the tones arranged in the same sequence and in the same number of rows as on the opposite side. The aperture or indexing window 36 indicates the key Major which in the set position is G. The key parallel to G Major is E Minor with which its keytone appears in the aperture or window 38. G Major comprises in addition to the G-chord the chords C and D Seventh as is indicated by the window group 40. The righthand window group 42 indicates that the G-chord is composed of the tones G, H and D. Furthermore, it becomes evident from the window group 44 which tones are comprised in the C-chord, viz. the tones C, E, G. The D Seventh-chord is presented by the window group 46. In the illustrated embodiment this chord comprises the tones D, F sharp, A, C.

The parallel key to G Major is the key E Minor which includes in addition to the E Minor-chord the A Minor-chord and the H Seventh-chord as will be seen from the window group 47. The E Minor-chord comprises the tones E, G, H according to the upper portion of the window group 42. The chord belonging thereto, viz. A Minor, comprises the tones A, C, E according to the group 44 and the H Seventh-chord the tones H, D sharp, F sharp, A according to the group 48.

The apertures or indexing windows belonging to the two keys are suitably marked by different colors. In FIG. 2 the marking is indicated by shading with vertical lines for Major key and by inclined lines for Minor key.

In the same manner as described hereinbefore, it is rendered possible by setting the slider and the slide member relatively to one another directly to read off which chords are comprised by the various Major and Minor keys and which tones are comprised by the various chords. The positions of the apertures in the slider and their interrelations are determined so relative the underlying rows of character designations that they for all keys lay open the designations of the tones included in the chords. On this side of the slider there are further formed apertures or indexing windows 50, 52 which lay open the key signatures valid for this tune, sharp or flat. In the illustrated embodiment, the key has one sharp according to the window 50.

According to FIG. 2, the slider 10 has a field 54 intended to define that position on the instrument in which a so-called capotasto shall be placed in order to facilitate accompaniment, especially in difficult keys or to obtain another timbre or tone quality. On the slider, there are indicated touches by the tone characters A, E, G, D, B flat, F and C in two transverse rows. Each tone character on the slider has a corresponding aperture in the slide member, said apertures together forming two transverse rows 56, 58. The row 56 comprises two apertures adjacent the tone characters A and E, respectively, whereas the row 58 comprises the other five tone characters. The apertures lay open tone characters on the slide member. The position set according to FIG. 2 is zero position indicated by the fret 0 in window 60, the tone characters on the slider and in the windows 56, 58 being the same. If now the capotasto is placed on e.g. the fret 3, the characters C, G, B flat, F, D flat, A flat, E flat will appear in the windows 56, 58 in the same sequence as they have been enumerated above as markings appearing on the slider. This implies that the A Major-touch will result in the C-chord, the E Major-touch in the G-chord and the G Major-touch in the B flat-chord etc. With some knowledge of playing chords, with the simple fundamental chords according to the tone characters on the slider one is in a position directly to execute the chords in all other keys.

While one more or less specific embodiment of the invention has been shown and described, it is to be understood that this is for purpose of illustration only and that the invention is not to be limited thereby, but its scope is to be determined by the appended claims.

What is claimed is:

1. A guide for a musical string instrument of the type having a fingerboard and frets for producing tones, and which directly indicates where the fingers of the hand are to be located along the individual strings of the instrument so that various tones shall be produced, comprising a slotted slider, and an elongate slide member movably housed in said slider, said slider and said slide member being slidably displaceable relative to one another in a direction extending longitudinally of said slide member, said slide member being provided with mutually parallel, longitudinally extending rows of pairs of conventional tone denoting characters, the number of said rows equalling the number of strings of the instrument, and successive pairs of characters in each of said rows being placed according to corresponding successive tone positions on a corresponding one of said strings, the slider having on one side thereof a plurality of spaced parallel fret denoting lines at least one series of openings devised selectively to register with and selectively to display, groups of characters, each of which groups is selected from among a predetermined plurality of successive pairs of said characters in each row thereof, the characters in each of said rows representing all tones, including full tones and half tones playable by the associated string, beginning from the key tone of said associated string and rising in scale over at least one octave, and each of said full tones and half tones in each octave being represented twice in immediate sequence on said slide member by one of said pairs of characters, and said series of openings being disposed in said slider in such manner that each group of characters displayed thereby incudes at least one basic key tone and all of the additional tones and half tones required to denote the scale for at least two octaves in said basic key tone.

2. The guide as claimed in claim 1 wherein said openings are arranged so that the characters of each of said groups of tone denoting characters are selected from among four successive pairs of said tone denoting characters in each row thereof.

3. The guide as claimed in claim 1, wherein said openings are arranged so that the groups of selected tone denoting characters consist either of the characters which form the first of the two characters in each pair thereof, or the second of said two characters of each pair.

4. The guide as claimed in claim 1, characterized in that the instrument is a guitar and the number of rows is six.

5. The guide as claimed in claim 1, wherein at least one field is arranged on the slider and comprises four rows corresponding to the number of fingers disposed to be used on the strings of the instrument, and extending transverse to the direction of said rows of tone denoting characters, and said openings are formed in said slider in such a manner as to have each opening register with one of said transverse rows on said slider and with one of said underlying rows of characters on said slide member thereby to display the registering tone denoting characters on the slide member in the sequence typical for the scale in the said basic key tone.

6. The guide as claimed in claim 1, wherein at least one of said openings in said series is marked in a manner distinguishing said one opening from the other openings in said slider.

7. The guide as claimed in claim 1, wherein said rows of characters are formed on each side of said slide member, and said slider has therein, in the side opposite that containing said one series of openings, a second series of openings disposed to register with and display characters which define chords in both key major and minor.

* * * * *